(12) United States Patent  
Liang et al.

(10) Patent No.: US 9,347,762 B2  
(45) Date of Patent: May 24, 2016

(54) NEAR-SURFACE OBJECT SENSING DEVICE AND SENSING METHOD

(71) Applicant: National Taiwan University, Taipei (TW)

(72) Inventors: Rong-Hao Liang, Taipei (TW); Bing-Yu Chen, Taipei (TW); Kai-Yin Cheng, Taipei (TW)

(73) Assignee: National Taiwan University, Taipei (TW)

( * ) Notice: Subject to any disclaimer, the term of this patent is extended or adjusted under 35 U.S.C. 154(b) by 499 days.

(21) Appl. No.: 13/865,475

(22) Filed: Apr. 18, 2013

(65) Prior Publication Data

US 2014/0207407 A1 Jul. 24, 2014

(30) Foreign Application Priority Data

Jan. 23, 2013 (TW) .............................. 102102422 A

(51) Int. Cl.
| | | |
|---|---|---|
| *G01D 5/14* | (2006.01) | |
| *G01B 7/004* | (2006.01) | |
| *G01B 7/00* | (2006.01) | |
| *G06F 3/046* | (2006.01) | |

(52) U.S. Cl.
CPC ................ *G01B 7/003* (2013.01); *G01B 7/004* (2013.01); *G01D 5/142* (2013.01); *G06F 3/046* (2013.01)

(58) Field of Classification Search
CPC combination set(s) only.
See application file for complete search history.

(56) References Cited

U.S. PATENT DOCUMENTS

| 8,723,509 B2 * | 5/2014 | Patterson et al. ........ 324/207.15 |
| 8,862,200 B2 * | 10/2014 | Sherman et al. ............. 600/407 |
| 2004/0041800 A1 * | 3/2004 | Daniels ......................... 345/204 |
| 2014/0257746 A1 * | 9/2014 | Dunbar et al. ................ 702/150 |

FOREIGN PATENT DOCUMENTS

| JP | 05-001913 | * | 1/1993 | ............... G01C 9/14 |
| JP | 2005-207746 | * | 8/2005 | ............... G01C 9/06 |

OTHER PUBLICATIONS

Computer-generated translation of JP 2005-207746, published on Aug. 2005.*
Computer-generated translation of JP 05-001913, published on Jan. 1993.*

(Continued)

*Primary Examiner* — Huan Tran
(74) *Attorney, Agent, or Firm* — Mintz Levin Cohn Ferris Glovsky and Popeo, P.C.; Peter F. Corless; Steven M. Jensen

(57) ABSTRACT

Disclosed is a near-surface object sensing device, including a printed circuit board, a plurality of magnetic sensors arrayed on the printed circuit board to sense the magnetic field of an external magnetic object and generate a magnetic sensing signal, a multiplexer connected to the magnetic sensors for selecting and outputting the magnetic sensing signal, and a microprocessor connected to the multiplexer for receiving the magnetic sensing signal, wherein the microprocessor includes a sampling algorithm module for converting the magnetic sensing signal into a magnetic field distribution image, and a six-dimensional coordinate-calculating module for calculating six-dimensional coordinates of the external magnetic object. The sensing device of the invention is compact, low energy consuming and can accurately provide users with a convenient and intuitive user interface with three dimensional locations and position information in a near-surface space.

12 Claims, 7 Drawing Sheets

(56) References Cited

OTHER PUBLICATIONS

Liang et al., "GaussSketch: Add-On Magnetic Sensing for Natural Sketching on Smartphones", (Published Aug. 5, 2012).

Liang et al., "GaussSense: Attachable Stylus Sensing Using Magnetic Sensor Grid", ACM (Published Oct. 9, 2012).

Liang et al., "GaussBrush: Drawing with Magnetic Stylus" (Published Nov. 28, 2012-Dec. 1, 2012).

\* cited by examiner

NEAR-SURFACE OBJECT SENSING DEVICE AND SENSING METHOD

CROSS-REFERENCES TO RELATED APPLICATIONS

This application claims under 35 U.S.C. §119(a) the benefit of Taiwanese Application No. 102102422, filed Jan. 23, 2013, the entire contents of which is incorporated herein by reference.

BACKGROUND OF THE INVENTION

1. Field of the Invention

The present invention relates to a technique for object sensing, and more particularly, to a near-surface object sensing device and a near-surface object sensing method.

2. Description of Related Art

The evolution of input interfaces and output methods of electronic devices changes with advanced technology, from the earliest pinhole plotter that was used as an input program, then the text-based user interface of using keyboard inputs and screen displays, to the recent window operating system of Graphical User Interface, GUI. A GUI represents the information and actions available to a user through graphical icons and visual indicators as opposed to text-based interfaces, typed command labels or text navigation. The downside is that GUIs are restricted to the scope of two-dimensional display with the resolutions able to describe generic information, and the actions are usually performed through direct manipulation of the graphical elements, and thus they require configurations of keyboards, mouse and display screens as well as users' manipulation of keyboard input and mouse. As such, new user interfaces have been continuously proposed for users to interact more naturally and instinctively for utmost convenience, such as tangible user interface, TUI. However, conventional tangible user interfaces are based on two-dimensional surface touch technology, and although the manipulation of three-dimensional interfaces by using computer vision technology or traditional electromagnetic sensing technology without a touch display screen is readily available, the computer vision technology is easily blocked and affected by occlusion and results in dead angles. On the other hand, while low frequency electromagnetic sensing technology can avoid interference of occlusion to sense objects, portability of such technology is compromised by the object to be sensed as it would require a power supply and the heavyweight transmitter for signal processing. Moreover, the conventional electromagnetic sensing technology also would have difficulties in recognizing tilting, hovering and rolling motions of an external magnetic object.

Therefore, it is highly desirable to propose a novel near-surface object sensing device and sensing method capable of accurately sensing six-dimensional coordinates locations of an external object to overcome the drawbacks as encountered in prior techniques, thereby allowing users to have a more diversified, spontaneous and instinctive manipulation which is occlusion-free, near-surface, compact-and-light-weight high portability and easy installation.

SUMMARY OF THE INVENTION

The invention provides a near-surface object sensing device, including a printed circuit board; a plurality of magnetic sensors arrayed on the printed circuit board to sense the magnetic field of an external magnetic object and generate a plurality of magnetic sensing signals; a multiplexer electrically connected to the magnetic sensors to select a magnetic sensing signal to be output, and a microprocessor electrically connected to the multiplexer for receiving the magnetic sensing signal, wherein the microprocessor includes a sampling algorithm module for converting the magnetic sensing signal into a magnetic field distribution image, and a six-dimensional coordinates-calculating module for calculating six-dimensional coordinates of the external magnetic object.

The present invention further provides a near-surface object sensing device, including a printed circuit board electrically connected to at least an electronic device; a plurality of magnetic sensors arrayed on the printed circuit board to sense the magnetic field of an external magnetic object and generate magnetic sensing signals; a multiplexer electrically connected to each of the magnetic sensors to select the magnetic sensing signals to be output, and a microprocessor electrically connected to the multiplexer for receiving the magnetic sensing signals, converting the signals into a magnetic field distribution image and transmitting the magnetic field distribution image to the electronic device, wherein the electronic device includes a six-dimensional coordinates-calculating module for calculating six-dimensional coordinates of the external magnetic object according to the magnetic field distribution image.

The present invention further provides a near-surface object sensing method, including the steps of (1) sensing the magnetic field of an external magnetic object to generate magnetic sensing signals by a plurality of magnetic sensors arrayed on the printed circuit board; (2) converting the magnetic sensing signals into a magnetic field distribution image having north-polarity parts and south-polarity parts and determining first magnetic field intensity images in the magnetic field distribution image corresponding to the external magnetic object; (3) calculating the center of the first magnetic field intensity images to obtain positions of the external magnetic object on a plane on which the magnetic sensors are configured, and calculating the height of the external magnetic object with respect to the plane according to the magnetic field intensity corresponding to the first magnetic field intensity images; (4) obtaining second magnetic field intensity images by filtering out the magnetic field intensity that is higher than a predetermined threshold value and then comparing polarities and locations in the second and first magnetic field intensity images to determine whether the external magnetic object is a tiltable or a rollable object, wherein when the external magnetic object is a tiltable object, the second magnetic field intensity images are within the first magnetic intensity images and have the same polarities as those in the first magnet field intensity images, and when the external magnetic object is a rollable object, the second magnetic field images have two adjacent and different polarities, and the distance between the second magnetic field images of the rotated object is smaller than a predetermined value; (5) when the external magnetic object is a tiltable object, calculating the center of the second magnetic field intensity images to form a first vector by the center of the first magnetic field intensity images and the center of the second magnetic field intensity images, and obtaining a pitch angle and a yaw angle of the external magnetic object according to the first vector; and (6) when the external magnetic object is a rollable object, calculating the center of the second magnetic field intensity images to form a second vector and using the center point of the second vector as a center of a circle to obtain a roll angle of the external magnetic object according to the direction of the second vector.

Compared to conventional techniques, the sensing device and the sensing method of the present invention provide magnetic sensors arrayed on a printed circuit board, and thus have compact structures and low energy consumption. In the present invention, the external magnetic object can use a permanent magnetic material for a signal source without requiring an additional power supply. Further, the sensing device and the sensing method of the invention have a six-dimensional coordinates-calculating module capable of calculating accurately three-dimensional positions (x, y, z) to provide three-dimensional direction information (roll, pitch and yaw angles), thereby providing users with a convenient and intuitive user interface within a near-surface space.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

The following illustrative embodiments are provided to illustrate the disclosure of the present invention, these and other advantages and effects can be understood by persons skilled in the art after reading the disclosure of this specification. Note that the structures, proportions, sizes depicted in the accompanying figures merely serve to illustrate the disclosure of the specification to allow for comprehensive reading without a limitation to the implementation or applications of the present invention, and does not constitute any substantial technical meaning.

Figure 1A:
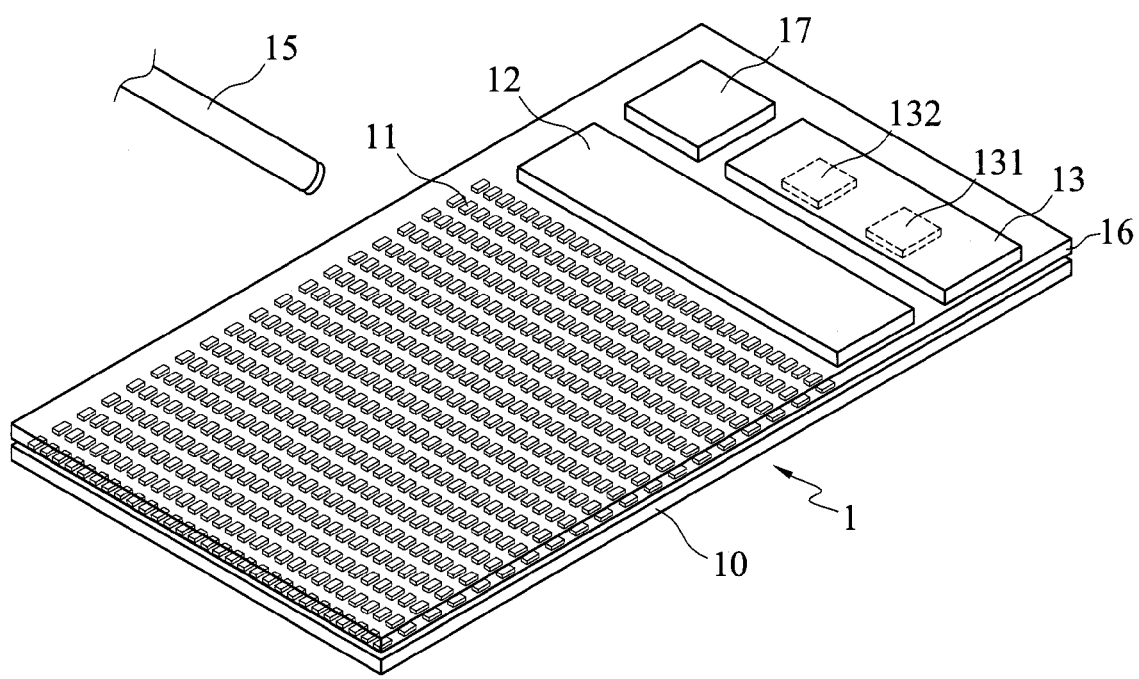
FIG. 1A is a schematic view of the near-surface object sensing device according to a first preferred embodiment of the present invention.
Figure 1B:
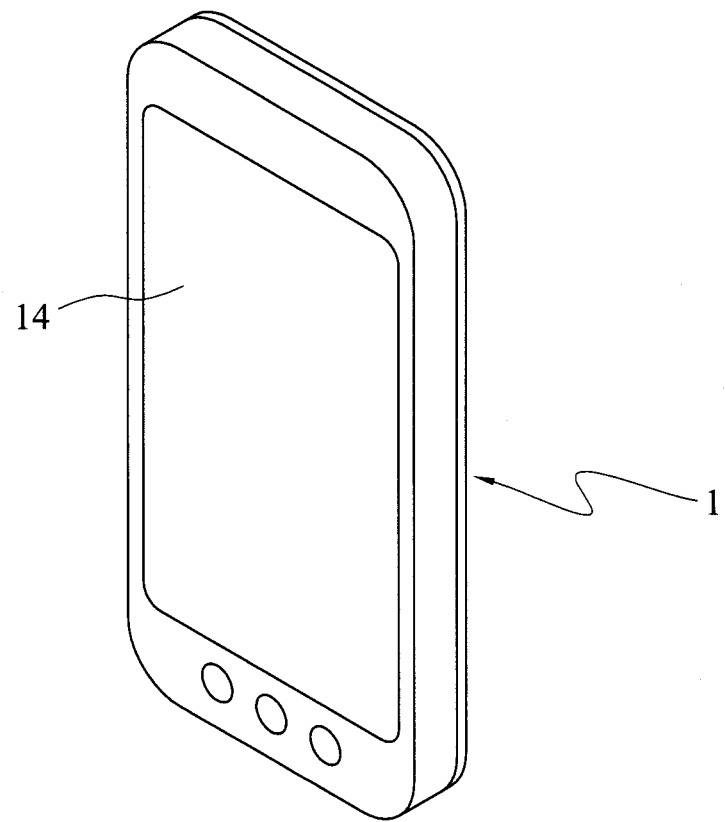
FIGS. 1B and 1C are schematic views showing the near-surface object sensing device coupled with an external electronic device according to the present invention.
Figure 1C:
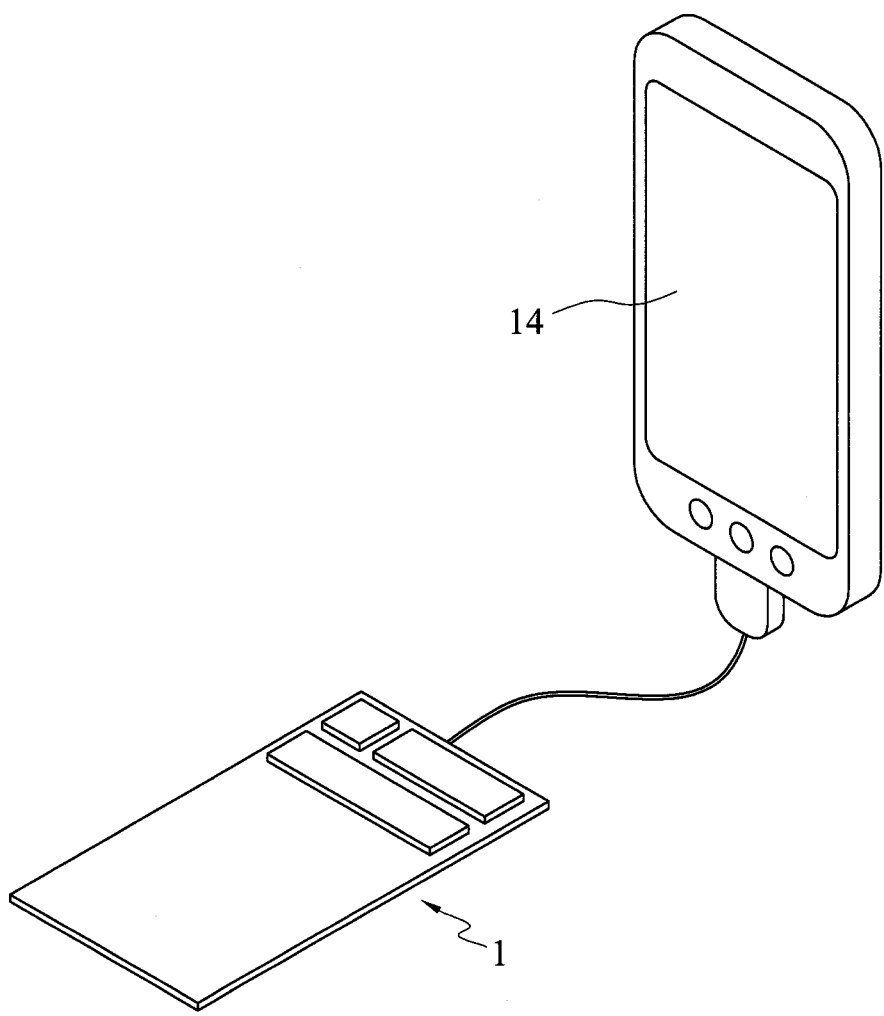

According to a first preferred embodiment of the present invention, FIG. 1A is a schematic view of the near-surface object sensing device 1, including a printed circuit board 10, a plurality of magnetic sensors 11, a multiplexer 12, and a microprocessor 13.

The printed circuit board 10 can be electrically connected to an external electronic device 14 which may be, for instance, a smart phone, a tablet computer, a notebook computer, a laptop computer, a hand-writing board or game machine etc., wherein the printed circuit board 10 may be attached to an external electronic device 14 (as shown in 1B), or operable as two separate units connected to each other via a cable or wirelessly to transmit data generated (as shown in 1C).

The magnetic sensors 11 are arrayed and disposed on the printed circuit board 10 and electrically connected to the printed circuit board 10 to sense the magnetic field of an external magnetic object and generate a magnetic sensing signal.

In one embodiment, the magnetic sensors 11 are of Hall-effect sensors.

In another embodiment, a protective layer 16 is disposed on the magnetic sensors 11 for protecting the sensors from being damaged.

The multiplexer 12 is electrically connected to each of the magnetic sensors 11 to select the magnetic sensing signal to be output. In one embodiment, the near-surface object sensing device 1 further includes an analog-to-digital conversion module 17 that is electrically connected to the multiplexer 12 for converting the sensing signals.

The microprocessor 13 is electrically connected to the multiplexer 12 for receiving the magnetic sensing signal, and includes a sampling algorithm module 131 for converting the magnetic sensing signal into a magnetic field distribution image, as well as a six-dimensional coordinates-calculating module 132 for calculating six-dimensional coordinates of the external magnetic object 15. In one embodiment, the sampling algorithm module 131 performs sampling by means of oversampling of Bicubic interpolation. In another embodiment, the six-dimensional coordinates calculated by the six-dimensional coordinates-calculating module 132 include the three-dimensional coordinates of a rectangular coordinate system as well as a pitch angle, a yaw angle and a roll angle of the external magnetic object 15.

Figure 2:
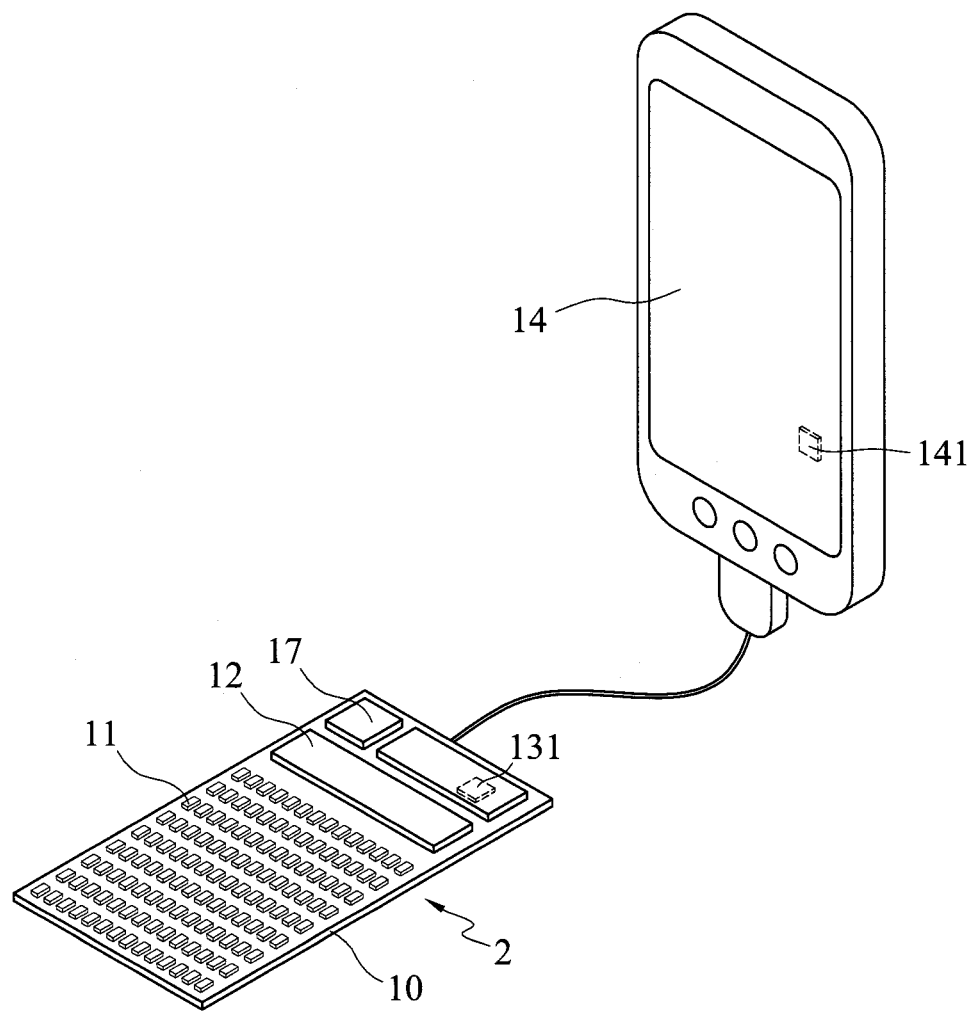
FIG. 2 is a schematic view of the near-surface object sensing device according to a second preferred embodiment of the present invention.

FIG. 2 is a schematic view illustrating the near-surface object sensing device a second preferred embodiment of according to the present invention. As shown, the near-surface object sensing device 2 includes a printed circuit board 10 electrically connected to at least an electronic device; a plurality of magnetic sensors 11, a multiplexer 12, and a microprocessor 13. The near-surface object sensing device in this second embodiment differs from that of the first embodiment in that the microprocessor 13 of this embodiment includes only a sampling algorithm module 131 for converting the magnetic sensing signal into a magnetic field distribution image and transmitting the magnetic field distribution image to at least an electronic device 14, wherein the electronic device 14 includes a six-dimensional coordinates-calculating module 141 for calculating six-dimensional coordinates of the external magnetic object 15 according to the magnetic field distribution image. The other characteristics of the near-surface object sensing device 2 are similar to those described in the foregoing first embodiment, and therefore further detailed descriptions thereof are omitted here for brevity.

Figure 3:
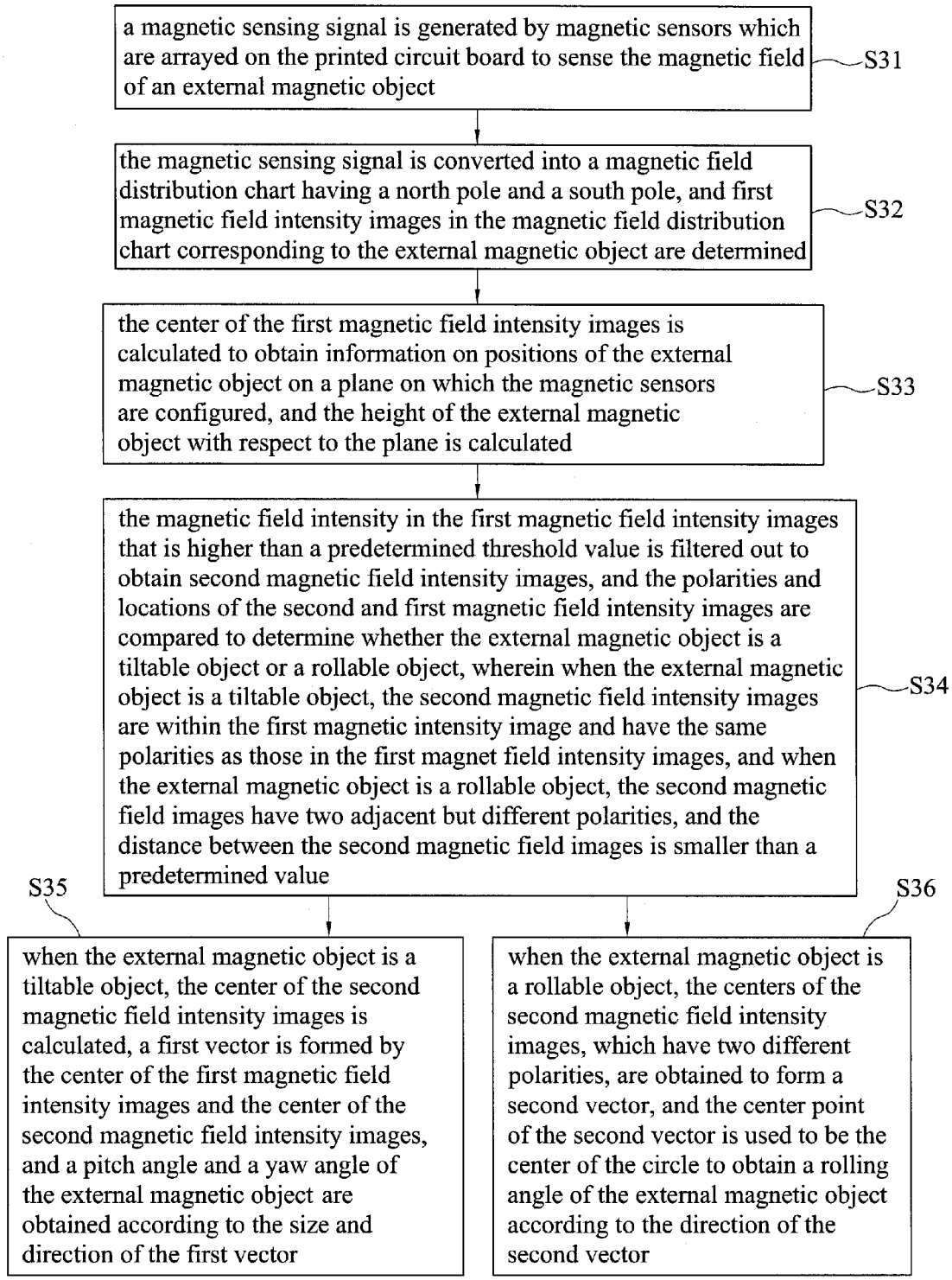
FIG. 3 is a flow diagram illustrating steps of sensing an object on a near-surface surface according to the present invention.

FIG. 3 is a flow diagram showing the steps of the near-surface object sensing method of the present invention. As depicted, the method of sensing a near-surface object includes following steps S31 to S36.

Figure 4A:
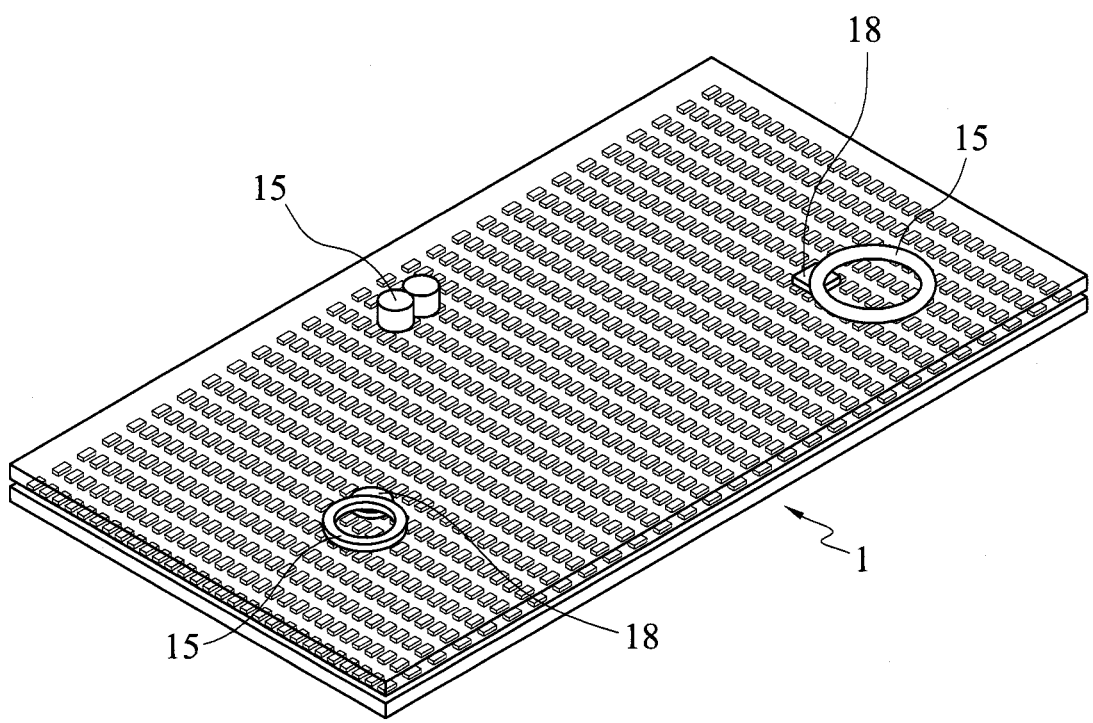
FIGS. 4A-4D are schematic views showing the process of sensing a near-surface object by the sensing device of the present invention.

In S31, a magnetic sensing signal is generated by using a plurality of magnetic sensors 11 that are arrayed on the printed circuit board 10 to sense the magnetic field of an external magnetic object 15, wherein non-magnetic spacers 18 are disposed under portions of the external magnetic object 15 for the object 15 to be tiltedly disposed on the printed circuit board 10, as shown in FIG. 4A.

Figure 4B:
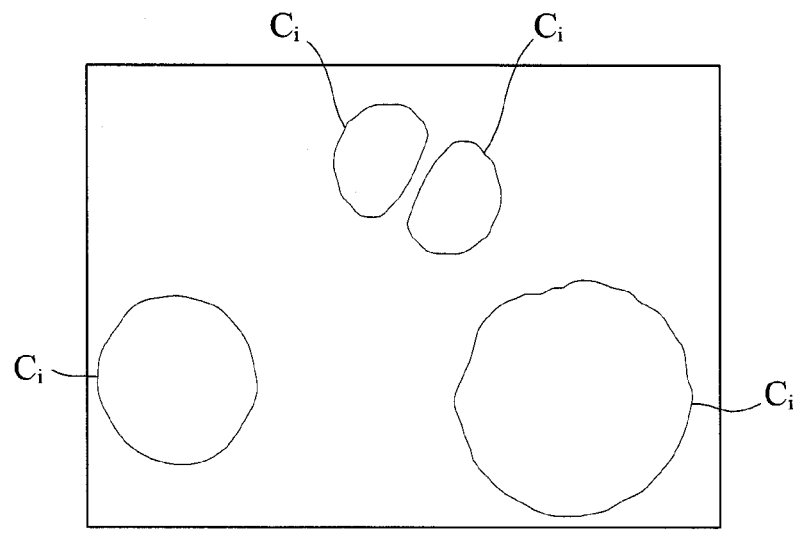

In S32, the magnetic sensing signal is converted into a magnetic field distribution image having north-polarity parts and south-polarity parts, and first magnetic field intensity images $C_i$ in a magnetic field distribution image corresponding to an external magnetic object 15 is determined, as shown in FIG. 4B.

In this embodiment, before determining the first magnetic field intensity images $C_i$ in the magnetic field distribution image corresponding to the external magnetic object 15, S32 further includes filtering out noise signals that have a magnetic field intensity lower than the predetermined threshold value in the magnetic field distribution image.

In S33, the center Oi of the first magnetic field intensity images Ci is calculated to obtain information on positions of the external magnetic object 15 on a plane on which the magnetic sensors 11 are configured, and the height of the external magnetic object 15 with respect to the plane according to the magnetic field intensity corresponding to the first magnetic field intensity images Ci.

In S34, the magnetic field intensity in the first magnetic field intensity images $C_i$, $C_i^{\prime s}$, $C_i^{\prime\prime}$ that is higher than a predetermined threshold value is filtered out to obtain second magnetic field intensity images $C_i^{\prime}$, and the polarities and locations of the second and first magnetic field intensity images $C_i^{\prime}$, $C_i$ are compared to determine whether the external magnetic object 15 is a tiltable object or a rollable object. When the external magnetic object 15 is a tiltable object, the second magnetic field intensity images $C_i^{\prime}$ are within the first magnetic intensity images $C_i$ and have the same polarities as those in the first magnet field intensity images $C_i$. When the external magnetic object 15 is a rollable object, the second magnetic field images $C_i^{\prime}$ has two adjacent but different polarities, and the distance between the second magnetic field images $C_i^{\prime}$ is smaller than a predetermined value.

Figure 4C:
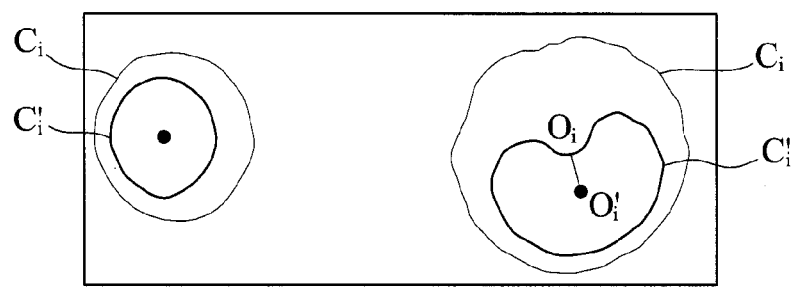

In S35, When the external magnetic object 15 is a tiltable object, the center $O_i^{\prime}$ of the second magnetic field intensity images $C_i^{\prime}$ is calculated, a first vector $\vec{v}_1 = O_i^{\prime} - O_i$ is formed by the center $O_i$ of the first magnetic field intensity images $C_i$ and the center $O_i^{\prime}$ of the second magnetic field intensity images $C_i^{\prime}$, and a pitch angle and a yaw angle of the external magnetic object 15 are obtained according to the value and direction of the first vector, as shown in FIG. 4C, indicating the tilt status of the external magnetic object 15.

Figure 4D:
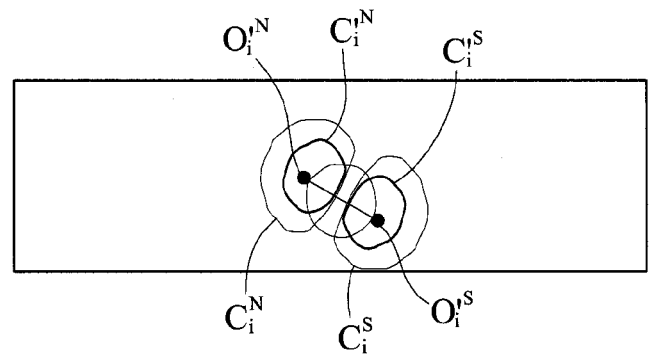

In S36, the centers $O_i^{\prime N}$ and $O_i^{\prime S}$ of the two different polarities in the second magnetic field intensity images $C_i^{\prime N}$ and $C_i^{\prime S}$ of the rollable object are obtained to form a second vector $\vec{v}_2 = O_i^{\prime S} - O_i^{\prime N}$, and the center point of the second vector is used to be the center of the circle to obtain a rolling angle of the external magnetic object 15 according to the direction of the second vector, as shown in FIG. 4D.

Accordingly, in the sensing device and the sensing method of the invention, a plurality of magnetic sensors are integrated and arrayed on a printed circuit board so as to have high portability, low energy consumption, occlusion-free near-surface interactions and easy installation. Further, the sensing device and the sensing method of the invention include a sampling algorithm module and a six-dimensional coordinates-calculating module to accurately calculate three-dimensional positions of the external magnetic object and provide the three-dimensional direction information (roll, pitch and yaw angles), thereby providing users with a natural and convenient user interface.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:
1. A near-surface object sensing device, comprising
a printed circuit board;
a plurality of magnetic sensors arrayed on the printed circuit board to sense magnetic field of an external magnetic object and generate a plurality of magnetic sensing signals;
a multiplexer electrically connected to the magnetic sensors for selecting at least one of the magnetic sensing signals to be output; and
a microprocessor electrically connected to the multiplexer for receiving the at least one of magnetic sensing signals, wherein the microprocessor comprises:
a sampling algorithm module for converting the at least one of magnetic sensing signals into a magnetic field distribution image having north-polarity parts and south-polarity parts, and
a six-dimensional coordinates-calculating module for calculating six-dimensional coordinates of the external magnetic object.

2. The near-surface object sensing device of claim 1, wherein the plurality of magnetic sensors are of Hall-effect sensors.

3. The near-surface object sensing device of claim 1, further comprising a protective layer disposed on the magnetic sensors for protecting the magnetic sensors from being damaged.

4. The near-surface object sensing device of claim 1, further comprising an analog-to-digital conversion module electrically connected to the multiplexer for converting the magnetic sensing signals.

5. The near-surface object sensing device of claim 1, wherein the six-dimensional coordinates are three-dimensional coordinates in a rectangular coordinate system as well as a pitch angle, a yaw angle, and a roll angle.

6. A near-surface object sensing device, comprising:
a printed circuit board electrically connected to at least an electronic device;
a plurality of magnetic sensors arrayed on the printed circuit board to sense magnetic field of an external magnetic object and generate a plurality of magnetic sensing signals;
a multiplexer electrically connected to each of the magnetic sensors for selecting at least one of the magnetic sensing signals to be output; and
a microprocessor electrically connected to the multiplexer for receiving the at least one of the magnetic sensing signals, converting the at least one of the magnetic sensing signals into a magnetic field distribution image having north-polarity parts and south-polarity parts, and transmitting the magnetic field distribution image to the electronic device, wherein the electronic device includes a six-dimensional coordinates-calculating module for calculating six-dimensional coordinates of the external magnetic object according to the magnetic field distribution image.

7. The near-surface object sensing device of claim 6, wherein the plurality of magnetic sensors are of Hall-effect sensors.

8. The near-surface object sensing device of claim 6, further comprising a protective layer disposed on the magnetic sensors for protecting the magnetic sensors from being damaged.

9. The near-surface object sensing device of claim 6, further comprising an analog-to-digital conversion module electrically connected to the multiplexer for converting the at least one of the magnetic sensing signals.

10. The near-surface object sensing device of claim 6, wherein the six-dimensional coordinates are the three-dimensional coordinates in a rectangular coordinate system as well as a pitch angle, a yaw angle, and a roll angle.

11. A near-surface object sensing method, comprising the steps of:

(1) sensing magnetic field of an external magnetic object by a plurality of magnetic sensors arrayed on a printed circuit board to generate a plurality of magnetic sensing signals;
(2) converting the magnetic sensing signals into a magnetic field distribution image having north-polarity parts and south-polarity parts and determine first magnetic field intensity images in the magnetic field distribution image corresponding to the external magnetic object;
(3) calculating a center of the first magnetic field intensity images so as to obtain positions of the external magnetic object on a plane on which the magnetic sensors are configured, and calculating a height of the external magnetic object with respect to the plane according to a magnetic field intensity corresponding to the first magnetic field intensity images;
(4) obtaining second magnetic field intensity images by filtering out a part of the magnetic field intensity that is higher than a predetermined threshold value and then comparing polarities and locations in the second and first magnetic field intensity images to determine whether the external magnetic object is a tiltable or a rollable object, wherein when the external magnetic object is a tiltable object, the second magnetic field intensity images are within the first magnetic intensity images and have the same polarities as those in the first magnet field intensity images, and when the external magnetic object is a rollable object, the second magnetic field images have two adjacent and different polarities, and the distance between the second magnetic field images is smaller than a predetermined value;
(5) when the external magnetic object is a tiltable object, calculating a center of the second magnetic field intensity images to form a first vector by the center of the first magnetic field intensity images and the center of the second magnetic field intensity images, and obtaining a pitch angle and a yaw angle of the external magnetic object according to the first vector; and
(6) when the external magnetic object is a rollable object, calculating a center of the second magnetic field intensity images to form a second vector and using a center point of the second vector as a center of a circle to obtain a roll angle of the external magnetic object according to a direction of the second vector.

12. The near-surface object sensing method of claim 11, wherein before determining the first magnetic field intensity images of the external magnetic object, step (2) further comprises filtering out noise signals in the magnetic field distribution image.

* * * * *